(No Model.) 2 Sheets—Sheet 2.
F. PETRI.
METHOD OF AND MEANS FOR TREATING SEWAGE.
No. 259,202. Patented June 6, 1882.
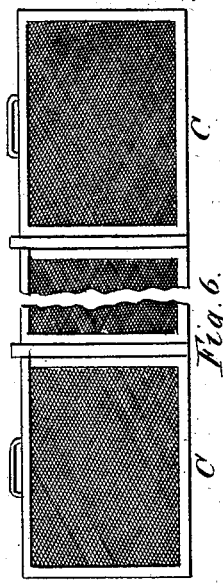
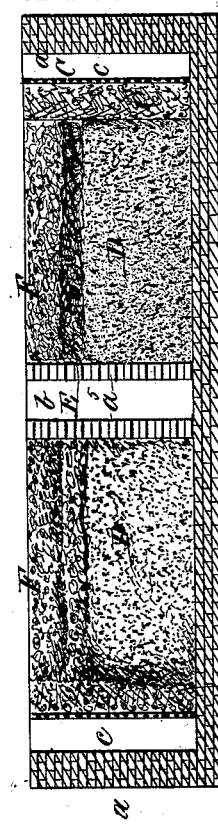
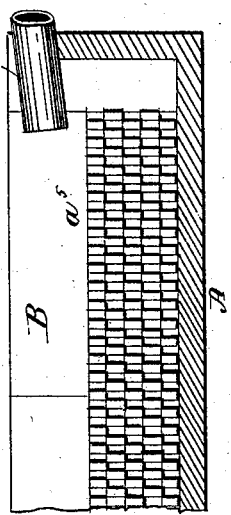
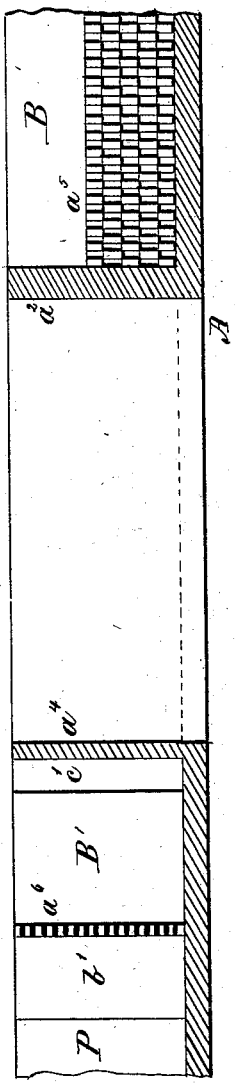
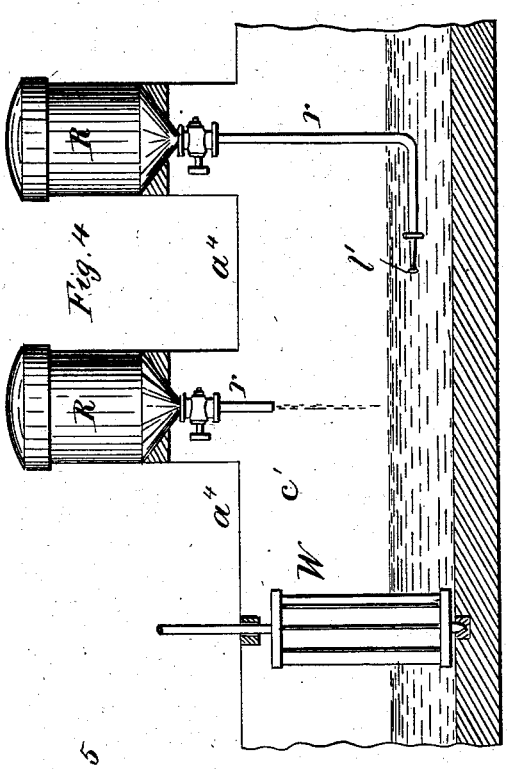

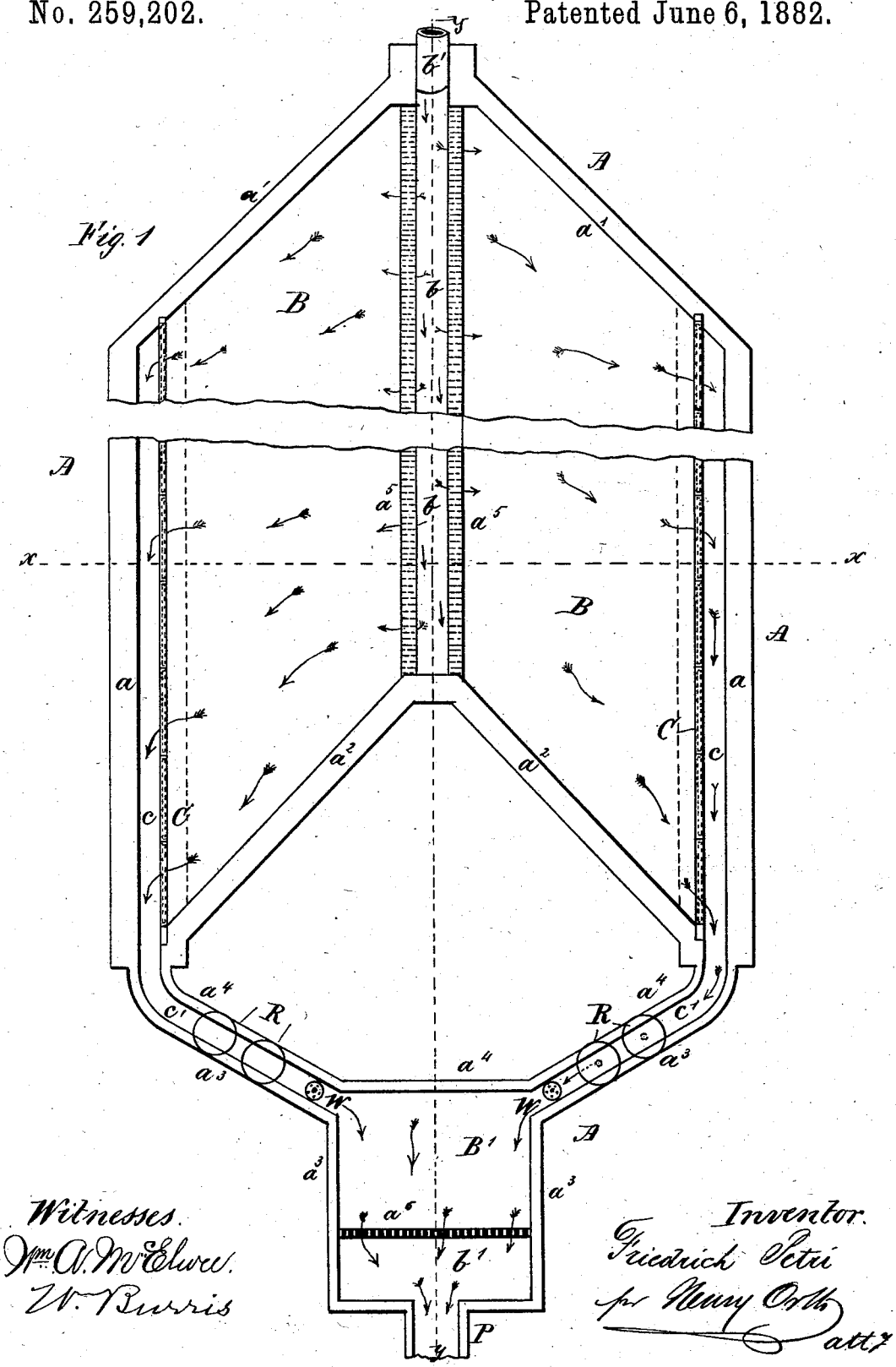

UNITED STATES PATENT OFFICE.

FRIEDRICH PETRI, OF BERLIN, GERMANY.

METHOD OF AND MEANS FOR TREATING SEWAGE.

SPECIFICATION forming part of Letters Patent No. 259,202, dated June 6, 1882.

Application filed December 8, 1881. (No model.) Patented in Belgium December 9, 1881, No. 56,444; in France December 9, 1881, No. 146,279; in England December 9, 1881, No. 5,390, and in Italy December 31, 1881, XXVII, No. 179.

*To all whom it may concern:*

Be it known that I, FRIEDRICH PETRI, doctor of philosophy, a subject of the King of Prussia, residing at Berlin, Prussia, German Empire, have invented certain new and useful Improvements in Methods and Means for Treating Sewage; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide means whereby the drainage of cities may be cheaply disposed of, converted into fertilizers, and its deleterious effects upon health destroyed; and it consists, first, in the method of treating sewage to remove therefrom its organic constituents and convert them into a fertilizer; and, secondly, in the means employed therefor, as hereinafter fully described.

With a few exceptions, it is now the universal practice of discharging the sewage of cities into water-courses wherever such can be made available for the purpose. The great quantities of such sewage discharged into the stream or river not only tend to and do contaminate the entire body of water to a greater or less extent, but form deposits upon its banks, or where the water is shallow and forms eddies, especially in such rivers as are within range of the tides and in which such shallow places are left dry at low tides. These deposits, as is well known, are the cause of various malarial diseases, and materially affect the general health of a city so exposed, which, were this cause removed, would be exceptionally healthy. In some instances irrigation of land has been resorted to to deprive the sewage of its organic matter; but it has been found, and is well known, that the percolation of sewage through strata of earth does not effect the elimination of the organic substances held in suspension, and if such water is allowed to flow into streams, wells, or cisterns from which the water is used for domestic purposes its deleterious effects will be felt by those using it. On the other hand, it has been found that the sewage discharged into rivers or streams that supply the markets with fish is partly absorbed by the latter as food, and their flesh becomes contaminated and unfit for use.

In carrying out my improved method of treating sewage to avoid the related injurious effects, I proceed as follows: I first eliminate from the sewage all foreign substances, such as bones, rags, wood, and other like foreign bodies. I then pass the sewage through an absorbent substance—as small or refuse peat, or small charcoal, or charcoal-dust, sawdust, lignite, or analogous bodies—whereby a mechanical as well as a partly-chemical separation of the organic substances held in suspension in the sewage is effected. With this absorbent material antiseptic bodies having filtering properties are or may be mixed, such as gypsum, chalk, animal charcoal, and other like substance, which are not detrimental to health in case they should be carried into the stream or river into which the liquid is finally discharged. Upon this layer of absorbent material is placed a second layer of peat in small lumps, which have been previously saturated in a solution of two parts of carbolic or salicylic acid in one hundred parts of water and dried. Upon this is placed a third layer of a material that will allow air to pass through it—such as wood-shavings, chopped straw, chaff, or leaves from trees— with which I mix calcium bisulphate or potassium sulphate, the latter two layers being so arranged relatively to the layer of absorbent material that the sewage passing through will not rise sufficiently to saturate them, and result in their lixiviation.

The object of the two upper layers is to prevent the fermentation of the absorbent body by direct contact with atmospheric air, and its consequent putrefaction or decomposition, and also to prevent the escape of deleterious gases and bind the ammonia. After the sewage has passed through this body of absorbent material and has been deprived of the greater part of its organic substances, it is passed through a layer of brush-wood intermixed with gravel, whereby it is further filtered.

I have found that the water, after leaving the gravel-filter, yet contained traces of organic matter, but in quantities so small as to render the destruction of its deleterious effects very easy. For this purpose I use an acid or a chloride, or both, such as sulphuric or hydrochloric acid, or methyl, or ethyl, or other alcohol chloride. Of the acids I preferably use hydrochloric acid, owing to its cheapness.

The quantity of the acid or chloride, or both, to be used may be ascertained by treating small quantities of the filtered water, or by ascertaining the quantity of organic matter still held by the filtered water, such quantities being very limited, owing to the already great state of purity of the filtered sewage-water. I have found that if five grams of the acid or the chloride, or both, are used for every cubic meter of filtered sewage-water its organic constituents are effectually destroyed. The sewage-water is then passed through a layer of limestone to eliminate the acid, and finally through a layer of gravel to eliminate any lime which may be carried off thereby. The water escapes from this last filtering medium entirely free from all substances injurious to animal life, and is allowed to flow into a drain or stream or river.

In the accompanying drawings I have shown one convenient arrangement of structure and appliances to carry out the above-described method, though this arrangement, as will be readily understood from the description hereinafter given, may be greatly varied, both as to size, form, and location, and will depend in a great measure upon topographical features, area of surface drained, &c.

Figure 1 is a plan view of a basin, its ducts, and auxiliary basins. Figs. 2 and 3 are transverse and longitudinal sections, taken respectively on lines $x\ x$ and $y\ y$ of Fig. 1. Figs. 4 and 5 are respectively a longitudinal and a transverse section of so much of one of the channels, $c'$, of the plant as is necessary to illustrate the application of acid-reservoirs and the mixing-wheel. Fig. 6 is a detail view, showing the arrangement of wire screens.

Like letters of reference are employed in the above drawings to indicate like parts.

A represents the filtering-plant, which may be of any desired capacity, and as the absorbent material has to be removed once or twice yearly, according to the density of the sewage, I usually employ twin plants, one of the side walls, $a$, forming the partition-wall between the two. They are so connected with the feed-pipe that the flow of sewage may be cut off from one and turned into the other whenever the charged absorbent material is to be removed. Since both the plants are like in construction and operation, I have deemed it unnecessary to show them both in the drawings.

The plant A is constructed of masonry, preferably, and has a receiving-basin, B, and is interiorly preferably of a rhomboidal form, as shown, to facilitate the flow of the sewage. Its inclosing-walls $a'$ at one end are therefore inclined outwardly, and it has a like interior division-wall, $a^2$. The latter, together with the inclined walls $a^3\ a^4$, form channels that carry the sewage-water into a second basin, B', thence out of the plant through a suitable discharge-pipe or other outlet-pipe, P.

The basin B is divided longitudinally by means of perforated walls $a^5$, or by means of screens so arranged as to form a channel, $b$, on a line with the inlet $b'$ to the basin. In this manner the sewage flows down the channels $b$ and through the open-work walls or screens into the opposite sides of the basin B. The cemented floor of the basin is or may be made to incline or slope from said channel $b$ toward the side walls, $a$, and thence said floor may be made to slope toward the discharge orifice or outlet P.

A channel, $c$, is formed along each of the side walls by means of a row of filtering screens or plates, C, Fig. 6, arranged in suitable framework and adapted for removal, each of said filter-plates being provided with a handle.

On the inside of the filter-plates is formed a bank of filtering material, C', composed of brush-wood intermixed with gravel, as shown in Fig. 2. In the space between this filtering material C' and the walls or screens $a^5$ are formed three layers of absorbent and disinfecting or preserving layers D E F.

The former, D, is composed of an absorbent substance—such as refuse peat, sawdust, or an analogous absorbent substance—mixed with chalk, gypsum, or other substance having antiseptic properties. Upon this is formed a layer, E, of peat, in lumps, treated with carbolic or salicylic acid, as hereinbefore stated, and finally a layer, F, of chaff, chopped straw, wood shavings, or other like material, is formed, which had previously been mixed, or which is mixed during the spreading, with potassium sulphate, for purposes already described. The layer D should be of such thickness that the sewage percolating it will not saturate the two superposed layers E F, for purposes stated above. The filtered liquid, after passing through the absorbent material, the filtering material C', and filter-plate C, flows along the channels $c$ and their branches $c'$, that conduct it into the basin B'.

Above or in proximity to the branches $c'$ of channels $c$ are located the acid-reservoirs R R, from which the acid is allowed to drop, or from which the acid is fed to the outflowing water, for purposes above described.

The intimate mixture of the acid may be effected by allowing it to drop into the water, or by making the discharge-pipe $r$ thereof of sufficient length to reach below the level of the water, and providing it with or bending it into a horizontal discharge-nozzle, $i$, Fig. 4, said discharge-nozzle lying in the direction of the current, which is thus made to feed by suction. A wheel, W, moved by the current of the water or by other means, intimately mixes the liquid with the acid. The acidulated liquid flows into the basin B', that is divided by screens into a second basin, b'. The main basin B' is filled with limestone and the smaller basin b' with gravel, for purposes already explained, the sewage-water flowing out of the plant at P in a thoroughly-purified condition.

When the absorbent material in basin B is so impregnated with organic matter as to become inoperative it is removed and replaced by fresh substances. The two upper layers, F E, are carefully and successively removed, to be used again upon the fresh layer of absorbent material, and may be so used for a long period before it becomes necessary to renew them. The charged absorbent material is then air-dried and employed as a fertilizer.

I am aware that in the treatment of sewage, agitators have been employed for intimately mixing a disinfectant with the liquid sewage and I do not wish to claim such or analogous mechanical device or appliance, broadly.

Having now described my invention, what I desire to claim is—

1. The method of treating sewage which consists in the following successive steps: first, eliminating solid substances therefrom; second, passing it through a filtering and absorbent material composed of a porous or cellulose substance, such as described; third, subjecting the liquid so treated to a second filtering operation; fourth, acidulating the filtered liquid; fifth, neutralizing or eliminating the acid from the liquid; and, lastly, eliminating therefrom the neutralizing or acid-eliminating agent, substantially as described.

2. The method of treating sewage which consists in the following consecutive steps: first, eliminating therefrom the solid substances; second, passing the liquid through an absorbent filtering and antiseptic material, such as a porous or cellulose substance incorporated with antiseptic substances, as described; third, preventing fermentation of the absorbent material and binding the ammoniacal emanations by means of carbolic or analogous acid and potassium sulphate incorporated with substances such as described and applied as set forth; fourth, filtering the liquid a second time; fifth, acidulating the filtered liquid, or mixing therewith an alcohol chloride, as described; sixth, eliminating or neutralizing the acid or chloride; and, finally, eliminating the neutralizing agent by filtration, substantially as and for the purpose specified.

3. The herein-described plant, composed of a main basin, B, divided longitudinally by perforated walls or their equivalent to form the channel b, and by filter-walls C C' to form the channels c c, in combination with the auxiliary basin B' b' and channels c' c', constructed and arranged for operation substantially as and for the purpose specified.

4. The combination, with the channels c' c' of the plant A, of the reservoirs R R, constructed and arranged for operation substantially as and for the purpose specified.

5. The combination, with the channels c' c' of the plant A and the reservoirs R R, of the water-wheels W W, all constructed and arranged for operation substantially as and for the purpose specified.

In testimony whereof I affix my signature in presence of two witnesses.

FRIEDRICH PETRI.

Witnesses:
M. S. BREWER,
ADOLF DEMSLIUS.